United States Patent [19]

Graue et al.

[11] 4,421,696
[45] Dec. 20, 1983

[54] GAS DIFFUSER

[76] Inventors: William D. Graue, 4228 N. Central Exp./208, Dallas, Tex. 75206; Leo J. Oros, 440 N. Foster, Suite 303, Baton Rouge, La. 70806

[21] Appl. No.: 252,820

[22] Filed: Apr. 10, 1981

[51] Int. Cl.³ .............................................. B01F 3/04
[52] U.S. Cl. .................................... 261/123; 261/124
[58] Field of Search ............................... 261/123, 124

[56] References Cited

U.S. PATENT DOCUMENTS

| | | | |
|---|---|---|---|
| 166,508 | 8/1875 | Daschbach | 261/123 |
| 828,334 | 8/1906 | Peterson | 261/123 |
| 1,039,013 | 9/1912 | Berryman . | |
| 1,154,507 | 9/1915 | Gorton | 261/123 |
| 1,214,637 | 2/1917 | Zistel . | |
| 2,218,635 | 10/1940 | Borge . | |
| 2,430,749 | 11/1947 | Van Denburg . | |
| 2,510,427 | 6/1950 | Soucie | 261/124 |
| 2,540,948 | 2/1951 | Jeffery | 261/124 |
| 2,616,676 | 11/1952 | Walker . | |
| 3,153,682 | 10/1964 | Walker | 261/124 |
| 3,163,684 | 12/1964 | Gilbert | 261/124 |
| 3,207,313 | 9/1965 | Schulze | 261/123 |
| 3,592,450 | 7/1971 | Rippon | 261/123 |
| 3,679,187 | 7/1972 | Smith | 261/123 |
| 3,721,429 | 3/1973 | Young et al. | 261/123 |

FOREIGN PATENT DOCUMENTS

| | | | |
|---|---|---|---|
| 2253919 | 5/1974 | Fed. Rep. of Germany | 261/123 |
| 2437866 | 4/1980 | France | 261/123 |
| 302750 | 7/1968 | Sweden . | |
| 1088218 | 10/1967 | United Kingdom . | |

OTHER PUBLICATIONS

Walker Process Drawing No. 22B-343-5/75 (Chicago Bridge & Iron Co.).
Walker Process Drawing No. 22B-357-7/73 (Chicago Bridge & Iron Co.).
Enviroquip Pub. "Specification MS Air Diffuser", Drawing Entitled MS Diffuser Brass Orifice Ass'y, 10-20-80, and Photographs A, B, C & D by Applicant's Attorney, Enviroquip, Inc., 2526 Kramer Ln., P.O. Box 9069, Austin, Texas 78766.

Primary Examiner—Tim R. Miles
Attorney, Agent, or Firm—Richards, Harris & Medlock

[57] ABSTRACT

A gas diffuser for use in aeration treatment of water, sewage, industrial wastes and the like is provided. Gas is released from a plurality of vertical slot-shaped ports in a distribution tube. The gas released from said ports rises under the influence of buoyancy and impinges upon a frustro-conical distribution surface located above the distribution ports. The frustro-conical surface evenly disperses the gas to a shear edge whereupon small bubbles are created and violently mixed with the liquid to be treated. Drift control vanes are interposed in an equally-spaced relationship between the distribution ports to provide even distribution.

2 Claims, 4 Drawing Figures

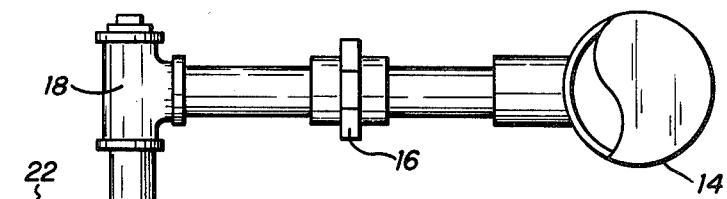
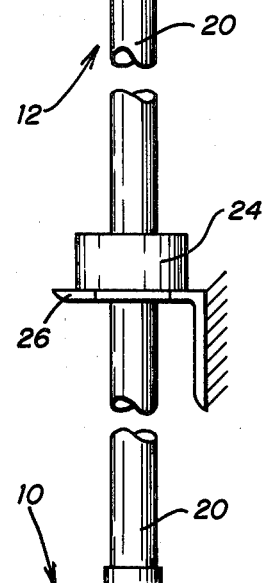
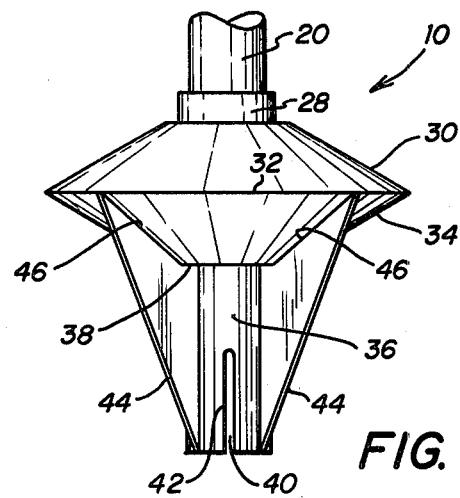
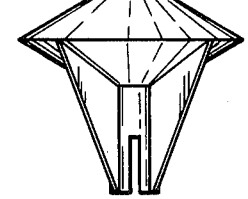
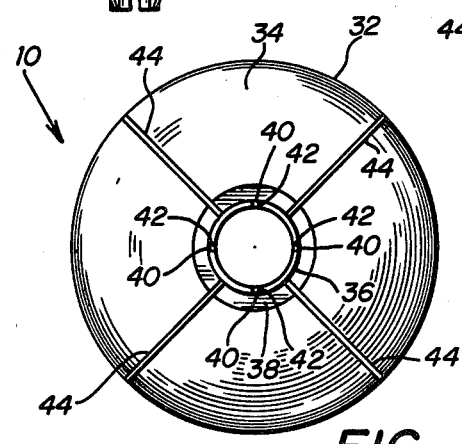
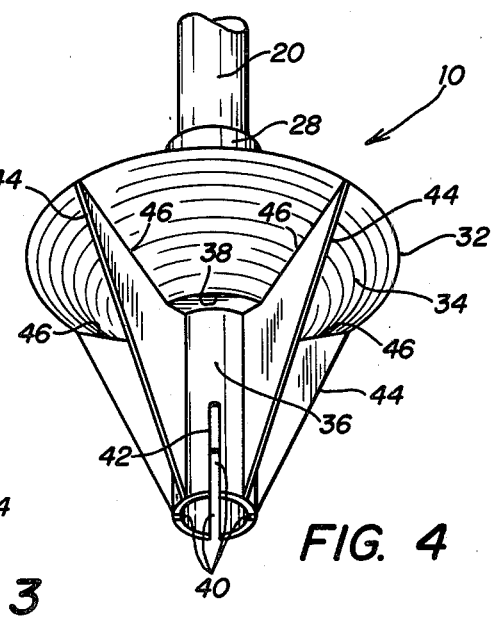

GAS DIFFUSER

TECHNICAL FIELD

The present invention relates to a device for diffusing gas into a liquid, and more particularly to a frusto-conical body to be submerged in a liquid and having ports disposed for the efficient contacting of air or other gas to a liquid in the aeration treatment of water, fluids, industrial wastes, processed liquids, or the like.

BACKGROUND ART

Gas diffusion devices have long been used to control the distribution of gas in processes which require aeration treatment. In such processes, the gas diffusion device is located below the liquid surface and is connected to a source of gas supply.

One type of gas diffusion device known in the art is constructed of a porous medium. Numerous small openings in the porous medium break the gas into small bubbles thereby increasing the gas/liquid contact. A drawback of these prior art devices is that the porous medium has a tendency to clog thereby reducing or completely stopping the aeration process.

Another type of gas diffusion device known in the art is the hollow-bodied diffuser such as that shown in U.S. Pat. No. 3,679,187 to Smith. The Smith diffuser is a four-sided pyramid-shaped body which is submerged beneath a liquid surface and connected to a source of air supply. Four slot-shaped orifices release gas at four positions spaced 90° apart on a vertical tube connected to a gas supply. The four-sided pyramid-shaped body is located directly above the slot-shaped orifices and is square in cross-section, having inclined planar surfaces positioned to spread out the air flow from the orifices. The gas is released through the orifices, rises to the flat inclined surfaces, and, because the surfaces are flat, does not become properly distributed before it reaches the shear edge, the edge of the pyramid-shaped body. The Smith diffuser does not sufficiently distribute gas because of the square cross-section and planar distribution surfaces. Thus, a need has arisen for a gas diffuser which is constructed to enable the efficient diffusion of gas into a liquid.

DISCLOSURE OF THE INVENTION

The present invention provides an improved device for diffusing gas into a liquid which substantially improves or eliminates the aforesaid deficiencies in prior art diffusion devices. In preferred form, the diffuser of the present invention is a hollow body having a plurality of slot-shaped ports disposed in a vertical tube structure through which gas is released. Immediately above the distribution tube is a frustro-conical directional distribution surface upon which the gas streams exiting the ports impinge. The directional distribution surface evenly distributes the gas streams as they rise. The frustro-conical surface terminates at a shear edge upon which gas bubbles are dispersed to the liquid. In preferred form, a plurality of drift control vanes are provided to equalize the spread of gas streams exiting each port. Other aspects and advantages will become apparent hereinafter.

BRIEF DESCRIPTION OF THE DRAWINGS

A more complete understanding of the invention and its advantages will be apparent from the Detailed Description taken in conjunction with the accompanying Drawings in which:

FIG. 1 is a side view of a gas diffusion system which includes a gas diffuser constructed in accordance with the invention;

FIG. 2 is a side view of the gas diffuser of the present invention;

FIG. 3 is a bottom view of the gas diffuser of FIG. 2; and

FIG. 4 is a perspective view of the gas diffuser of FIG. 2.

DETAILED DESCRIPTION

Referring initially to FIG. 1, a gas diffusion system includes gas diffuser 10 and header system 12. Header system 12 includes manifold 14, union 16, tee 18 and drop pipe 20. A portion of drop pipe 20 is submerged below liquid level 22. Drop pipe 20 is supported by drop support 24 and support angle 26. Fixed at the lowest end of drop pipe 20 is gas diffuser 10.

Referring now to FIGS. 2, 3 and 4, where like numerals are used for like and corresponding elements, the construction of gas diffuser 10 may be more clearly understood. Drop pipe 20 is rigidly and air-tightly connected to gas diffuser 10 at coupler 28. In the preferred embodiment, drop pipe 20 and coupler 28 have male and female thread profiles machined thereon respectively. Attached to coupler 28 is top 30, which in the preferred embodiment is a downwardly divergent frustro-conical member. It will be appreciated that the shape of top 30 is not critical to the operation of the invention and that any suitable structure or shape could be employed. Attached to top 30 at shear edge 32 is directional distribution surface 34. It is important to note that directional distribution surface 34 is an upwardly divergent frustro-conical surface having a vertical central axis, and therefore is circular in horizontal cross-section. Directional distribution surface 34 is joined with distribution tube 36 by means of spacer 38. Distribution tube 36 has four slot-shaped gas release ports 40 formed therein and defined by port edges 42. Four drift control vanes 44 are provided which extend from the lower extremity of distribution tube 36 to shear edge 32. The control vanes 44 are attached to directional distribution surface 34 at edges 46. It is to be understood that any number of ports 40 or drift control 44 could be provided without departing from the scope of the invention. The length and width of the gas release ports 40 and the diameter of the distribution tube 36 are chosen according to the amount of gas to be diffused and the effective area of the liquid to be treated.

In operation, header system 12 supplies gas to gas diffuser 10 from manifold 14 and through drop pipe 20. Typically, header system 12 is partially submerged and shown in FIG. 1. However, in many applications it is desirable to have header system 12 completely submerged. Further, in the new system it may be desirable to provide a restrictive orifice in header system 12 to control gas flow volume.

Gas from header system 12 passes through gas diffuser 10 and is released from distribution tube 36 through gas release ports 40. Gas, rising under the influence of buoyancy, impinges upon directional distribution surface 34. Because of the frustro-conical shape of directional distribution surface 34, the gas is spread evenly between drift control vanes 44 while rising and approaching shear edge 32. The gas bubbles remain entrapped in the liquid and are violently mixed to maximize the area of influence of the gas upon the liquid.

While only one embodiment of the present invention has been described in detail description and illustrated in accompanying drawings, it will be evident that various further modifications are possible without departing from the scope of the invention.

We claim:

1. A gas diffuser comprising:
   (a) coupling means for rigidly and air-tightly connecting the gas diffuser to a source of gas supply;
   (b) a frustro-conical directional distribution surface having a vertical central axis and diverging in an upward direction to terminate at a sharp circular shear edge, said directional distribution surface being attached to said coupling means;
   (c) a distribution tube which is attached to said directional distribution surface which extends in a downward direction from said directional distribution surface;
   (d) a plurality of port edges disposed in said distribution tube which define a plurality of slot-shaped distribution ports beneath said directional distribution surface such that gas streams escaping from said distribution ports rise under the influence of buoyancy, impinge upon said directional distributional surface, are evenly distributed to said shear edge, and are dispersed at the shear edge as bubbles; and
   (e) a plurality of drift control vanes extending from said distribution tube to said shear edge to control the distribution of gas streams to said shear edge.

2. The gas diffuser of claim 1 wherein said distribution tube has a lower extremity and said distribution ports are vertical slots being extending upward from said lower extremity of said distribution tube.

* * * * *